(12) United States Patent
Kawana et al.

(10) Patent No.: US 10,440,260 B2
(45) Date of Patent: Oct. 8, 2019

(54) DISPLAY CONTROL APPARATUS TO ENABLE A USER TO CHECK A CAPTURED IMAGE AFTER IMAGE PROCESSING

(71) Applicant: SONY CORPORATION, Tokyo (JP)

(72) Inventors: Yousuke Kawana, Tokyo (JP); Tsubasa Tsukahara, Tokyo (JP); Tomoya Narita, Tokyo (JP); Maki Imoto, Tokyo (JP); Takuro Noda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/861,766

(22) Filed: Jan. 4, 2018

(65) Prior Publication Data

US 2018/0131867 A1 May 10, 2018

Related U.S. Application Data

(63) Continuation of application No. 14/758,715, filed as application No. PCT/JP2013/080914 on Nov. 15, 2013, now Pat. No. 9,894,262.

(30) Foreign Application Priority Data

Jan. 8, 2013 (JP) .................................. 2013-001016

(51) Int. Cl.
*H04N 5/232* (2006.01)
*G06F 3/041* (2006.01)

(52) U.S. Cl.
CPC ....... *H04N 5/23216* (2013.01); *G06F 3/0416* (2013.01); *H04N 5/23293* (2013.01); *H04N 5/23296* (2013.01)

(58) Field of Classification Search
CPC ........... H04N 5/23216; H04N 5/23296; H04N 5/23293; G06F 3/0416
See application file for complete search history.

(56) References Cited

U.S. PATENT DOCUMENTS 7,839,445 B2 * 11/2010 Kim ................... H04N 1/00307
348/333.02
8,332,429 B2 12/2012 Poirier et al.
(Continued)

FOREIGN PATENT DOCUMENTS

EP 1521455 A2 4/2005
JP 11-284884 A 10/1999
(Continued)

OTHER PUBLICATIONS

International Search Report and Written Opinion of PCT Application No. PCT/JP2013/080914, dated Feb. 10, 2014, 07 pages of English Translation and 07 pages of IPRP.
(Continued)

*Primary Examiner* — Hung H Lam
(74) *Attorney, Agent, or Firm* — Chip Law Group

(57) ABSTRACT

There is provided a display control apparatus including: a display control unit configured to cause a display apparatus to display a live preview image generated based on image data obtained through an image sensor, and one or more processed images generated using respective image processing conditions based on one of the image data which has been obtained at some time point; and a determination unit configured to determine whether or not a predetermined user operation has been recognized. If it is determined that the predetermined user operation has been recognized, the display control unit updates the one or more processed images to be displayed.

16 Claims, 14 Drawing Sheets

(56) References Cited

U.S. PATENT DOCUMENTS

| | | |
|---|---|---|
| 9,497,384 B2 | 11/2016 | Panek-Rickerson |
| 2003/0169350 A1 | 9/2003 | Wiezel et al. |
| 2005/0057991 A1 | 3/2005 | Kosugiyama et al. |
| 2005/0088542 A1 | 4/2005 | Stavely et al. |
| 2005/0094015 A1 | 5/2005 | Kuruma |
| 2007/0171282 A1 | 7/2007 | Yanagi |
| 2010/0302409 A1* | 12/2010 | Matas ............... H04N 5/772 |
| | | 348/231.99 |
| 2013/0293746 A1 | 11/2013 | Iki |
| 2014/0146212 A1* | 5/2014 | Jung ............ H04N 5/23293 |
| | | 348/333.01 |

FOREIGN PATENT DOCUMENTS

| | | |
|---|---|---|
| JP | 2005-078343 A | 3/2005 |
| JP | 2005-110097 A | 4/2005 |
| JP | 2005-229326 A | 8/2005 |
| JP | 2007-194819 A | 8/2007 |
| JP | 2012-015827 A | 1/2012 |
| WO | 2007/083818 A1 | 7/2007 |

OTHER PUBLICATIONS

Notice of Allowance for U.S. Appl. No. 14/758,715, dated Oct. 4, 2017, 08 pages.
Non-Final Office Action for U.S. Appl. No. 14/758,715, dated Mar. 13, 2017, 15 pages.
International Preliminary Report on Patentability of PCT Application No. PCT/JP2013/080914, dated Jul. 23, 2015, 08 pages of English Translation and 04 pages of IPRP.

* cited by examiner

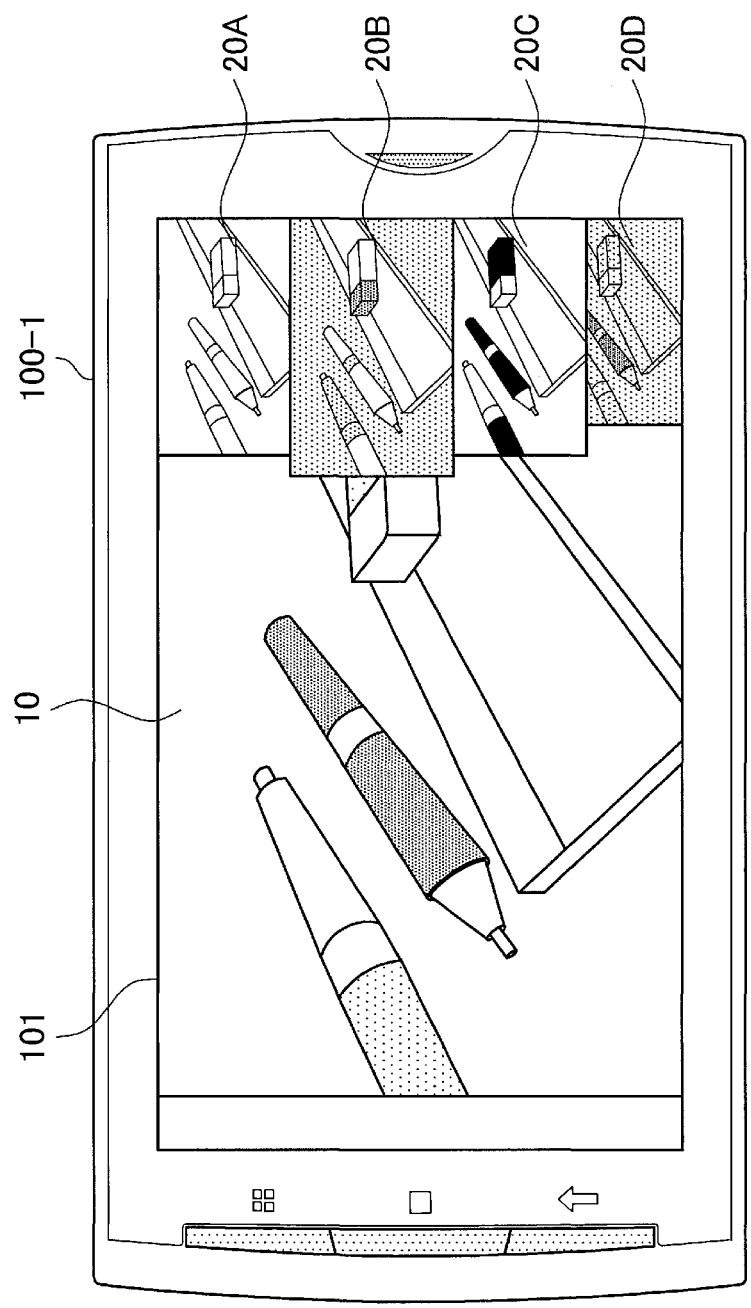

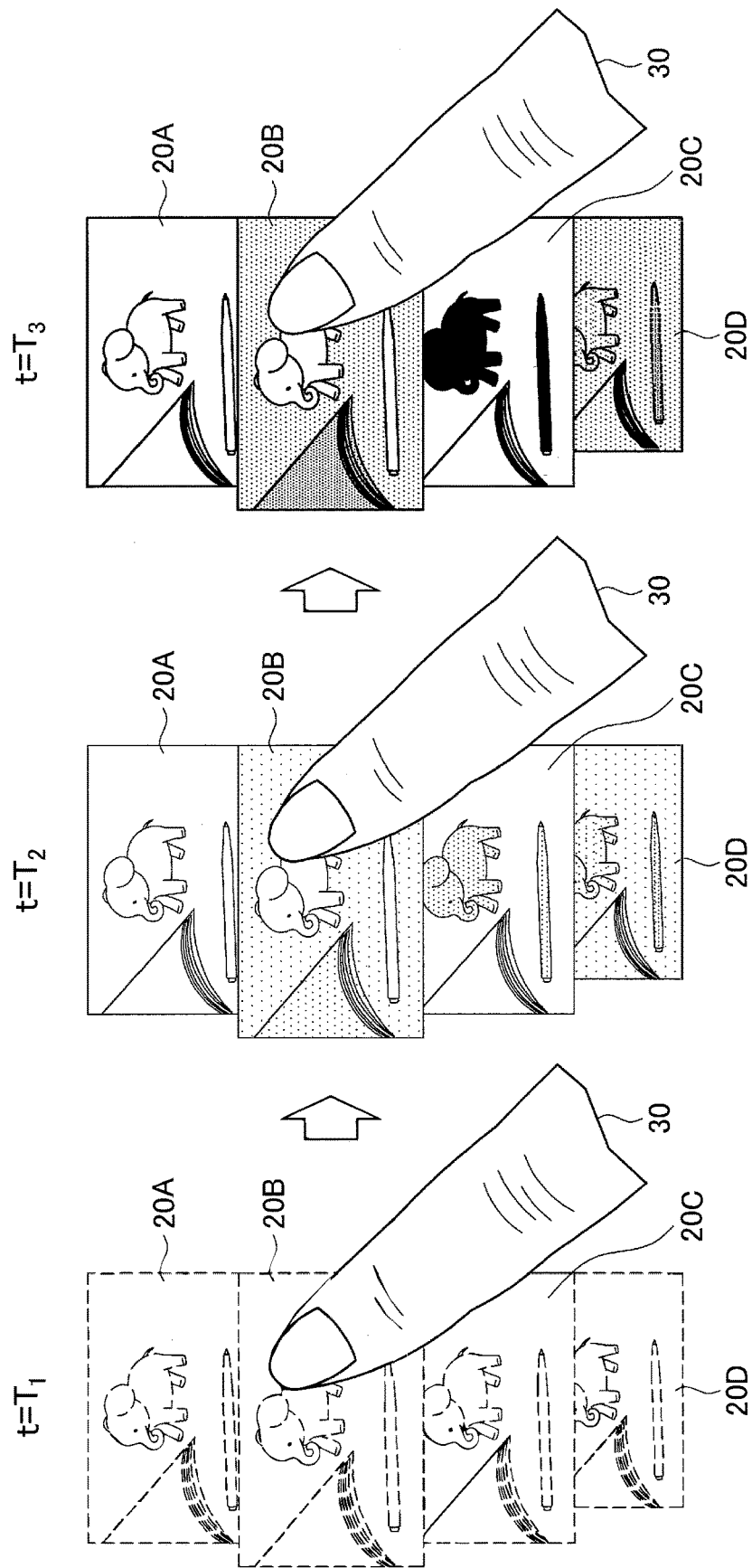

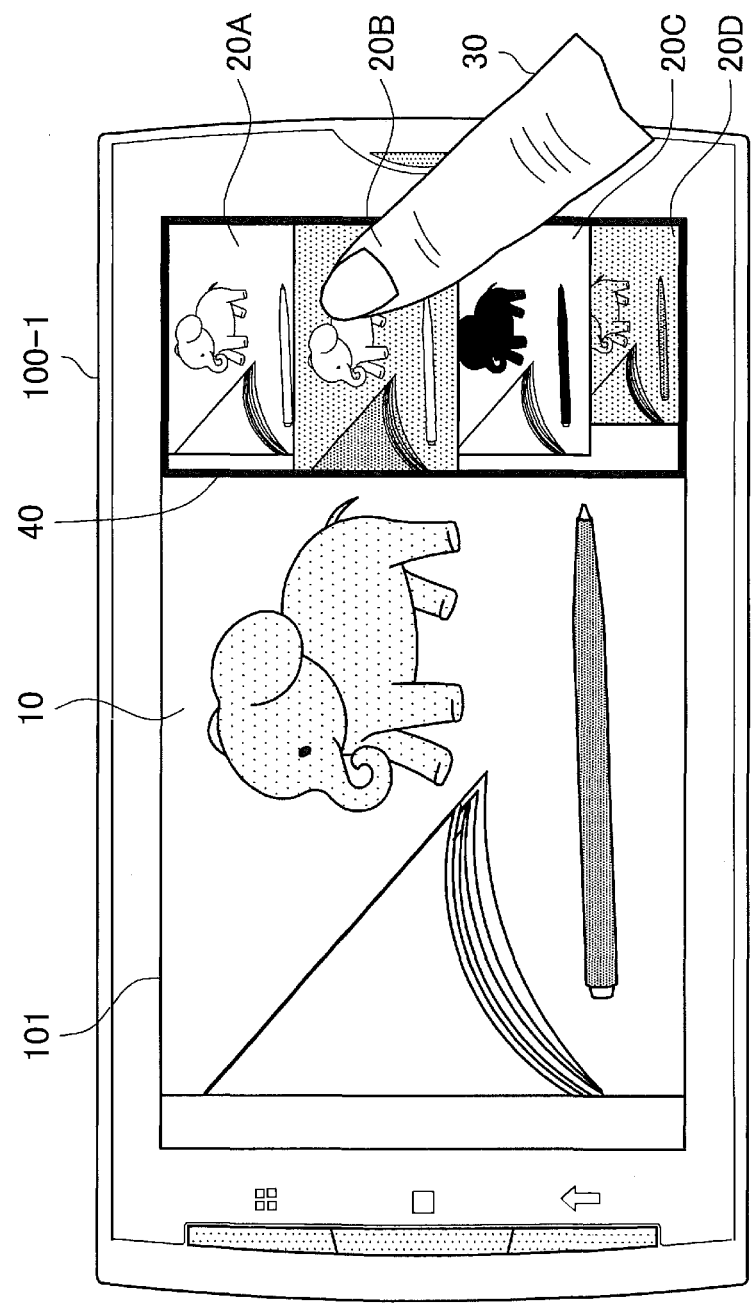

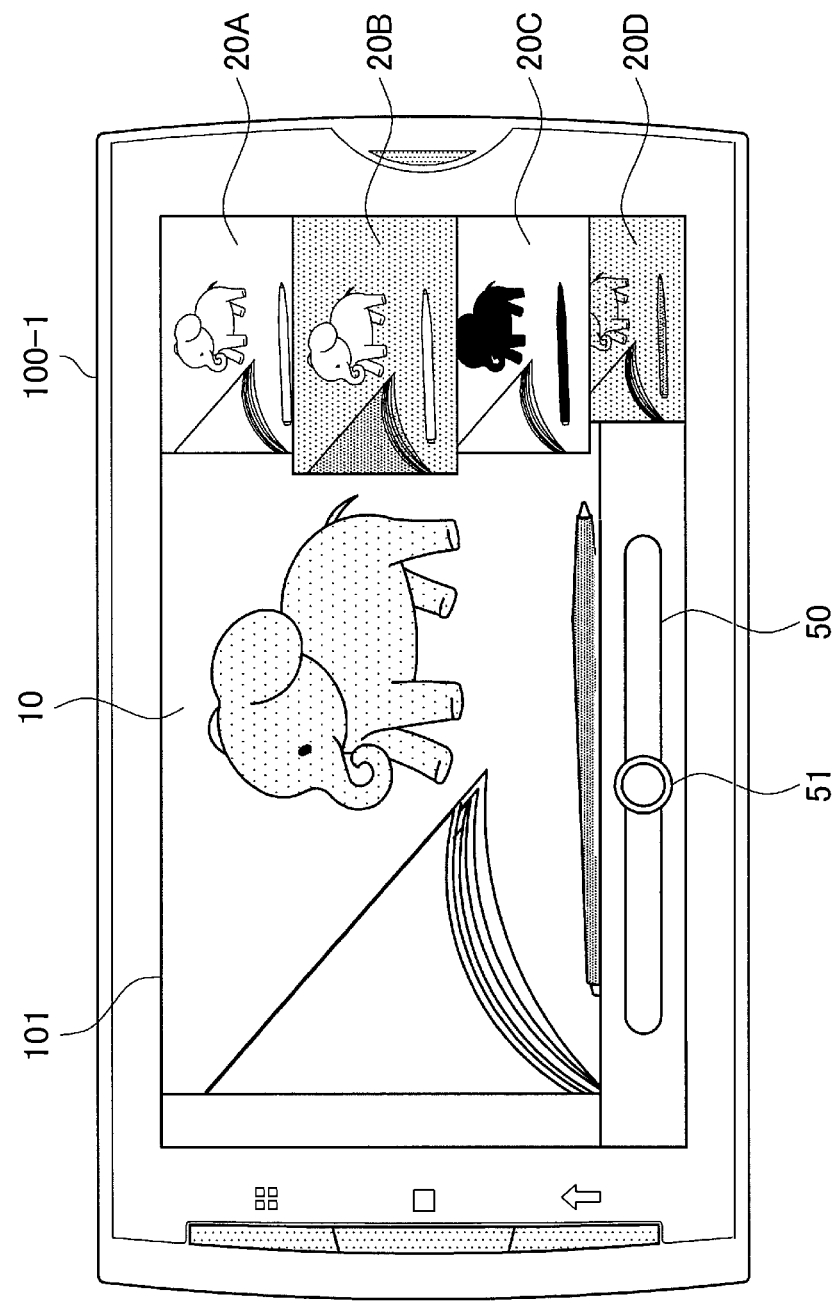

DISPLAY CONTROL APPARATUS TO ENABLE A USER TO CHECK A CAPTURED IMAGE AFTER IMAGE PROCESSING

CROSS-REFERENCE TO RELATED APPLICATIONS

The present application is a continuation application of U.S. patent application Ser. No. 14/758,715, filed on November Jun. 30, 2015, which is a National Stage of PCT/JP2013/080914, filed on Nov. 15, 2013, and which claims the benefit of priority from prior Japanese Patent Application JP 2013-001016, filed on Jan. 8, 2013, the entire content of which is hereby incorporated by reference.

TECHNICAL FIELD

The present disclosure relates to display control apparatuses, programs, and display control methods.

BACKGROUND ART

Digital cameras have in recent years become widespread. For example, digital cameras are produced as a dedicated apparatus or are incorporated in other apparatuses (e.g., a smartphone). Images generated through an image sensor, image processing circuit, and the like of a digital camera are typically stored as digital data and are displayed on a monitor.

A typical digital camera has functions of automatically performing exposure adjustment, color balance adjustment depending on the type of a light source, and the like, during shooting. Also, many digital cameras have a plurality of shooting modes corresponding to the types of subjects or the purposes of shooting, such as a person, flower, landscape, or night scene. Also, after a desired shooting mode has been selected during shooting, conditions for shooting, such as shutter speed, f-number, light source type, and the like, are automatically set suitable for the type of a subject or the purpose of shooting. Moreover, provided is a function of changing the tone of an image by an effect, depending on the preference of the user of the digital camera.

Patent Literature 1 describes a technique for use in the digital camera having the above functions that displays a live preview image (or a through image) on a monitor while displaying sample images obtained by changing the tone of an image captured at some time point as thumbnails on the monitor. This technique allows the user of the digital camera to select a thumbnail having the desired image tone while viewing the live preview image, and cause the digital camera to set shooting conditions.

CITATION LIST

Patent Literature

Patent Literature 1: JP 2007-194819A

SUMMARY OF INVENTION

Technical Problem

However, in the technique described in Patent Literature 1, a sample image displayed as a thumbnail is an image which has been obtained based on an image captured at some time point, and therefore, a live preview image may not match a thumbnail. Therefore, the user has difficulty in imagining which change it is desirable should be made in the tone of a live preview image even based on thumbnails. In other words, the user has difficulty in determining which thumbnail it is desirable should be selected to make shooting conditions.

On the other hand, thumbnails may be updated at a frame rate which is close to the frame rate of a live preview image. However, it takes time to perform image processing to obtain a thumbnail, and therefore, actually, the frame rate of a thumbnail may be lower than the frame rate of a live preview image. As a result, thumbnails may not be smoothly displayed, and may be displayed as if it dropped some frames. Therefore, there is a risk that viewing thumbnails causes the user a lot of stress.

Therefore, it is desirable to provide a way to allow the user to easily check a captured image after image processing, without stress, during shooting.

Solution to Problem

According to the present disclosure, there is provided a display control apparatus including: a display control unit configured to cause a display apparatus to display a live preview image generated based on image data obtained through an image sensor, and one or more processed images generated using respective image processing conditions based on one of the image data which has been obtained at some time point; and a determination unit configured to determine whether or not a predetermined user operation has been recognized. If it is determined that the predetermined user operation has been recognized, the display control unit updates the one or more processed images to be displayed.

According to the present disclosure, there is provided a program for causing a computer to function as: a display control unit configured to cause a display apparatus to display a live preview image generated based on image data obtained through an image sensor, and one or more processed images generated using respective image processing conditions based on one of the image data which has been obtained at some time point; and a determination unit configured to determine whether or not a predetermined user operation has been recognized. If it is determined that the predetermined user operation has been recognized, the display control unit updates the one or more processed images to be displayed.

According to the present disclosure, there is provided a display control method including: causing a display apparatus to display a live preview image generated based on image data obtained through an image sensor, and one or more processed images generated using respective image processing conditions based on one of the image data which has been obtained at some time point; and determining whether or not a predetermined user operation has been recognized. If it is determined that the predetermined user operation has been recognized, the one or more processed images to be displayed are updated.

Advantageous Effects of Invention

As described above, according to the present disclosure, the user is allowed to easily check a captured image after image processing, without stress, during shooting.

BRIEF DESCRIPTION OF DRAWINGS

FIG. 4 is an explanatory diagram for describing an example of a screen containing a live preview image and processed images.

FIG. 6 is an explanatory diagram for describing an example notification animation which notifies update of a processed image.

FIG. 7 is an explanatory diagram for describing an example notification object which notifies update of a processed image.

FIG. 8 is an explanatory diagram for describing an example parameter changing object.

DESCRIPTION OF EMBODIMENTS

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

Note that description will be provided in the following order.
1. External appearance of display control apparatus
2. First embodiment
   2.1. Configuration of display control apparatus
   2.2. Flow of process
3. Second embodiment
   3.1. Configuration of display control apparatus
   3.2. Flow of process
4. Hardware configuration
5. Conclusion

1. External Appearance of Display Control Apparatus

Figure 1:
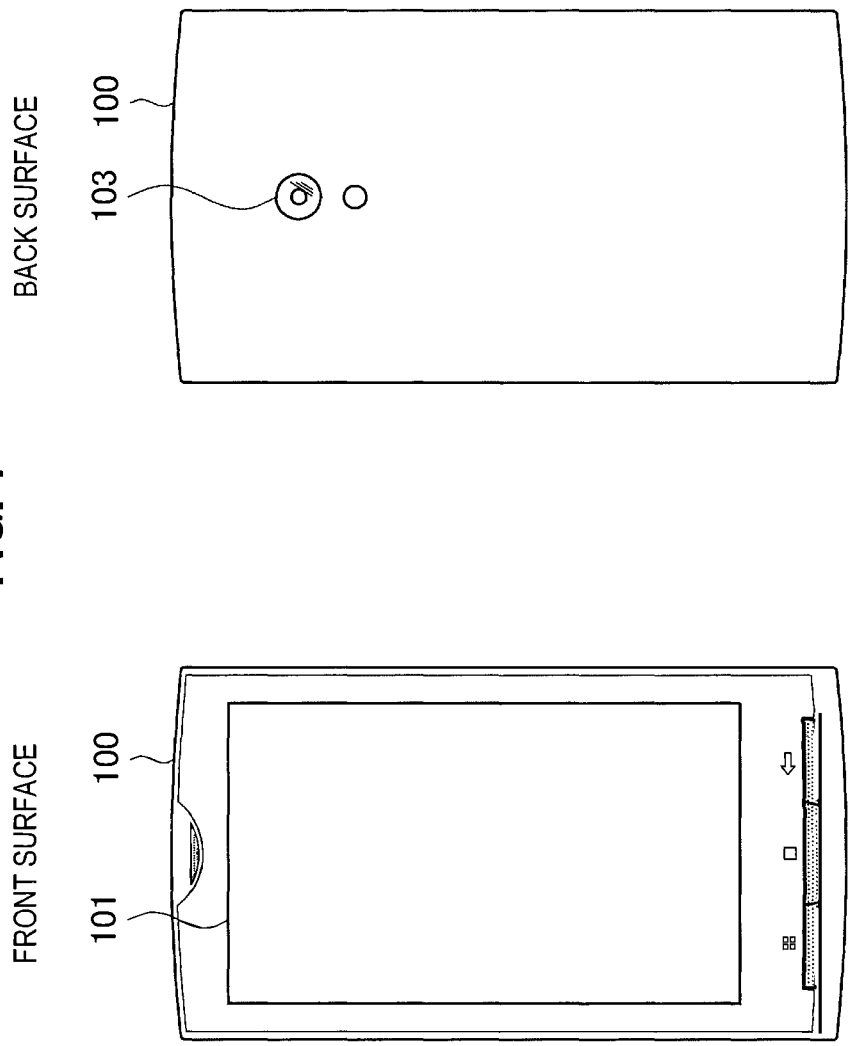
FIG. 1 is an explanatory diagram for describing an example external appearance of a display control apparatus according to an embodiment of the present disclosure.

Firstly, an external appearance of a display control apparatus according to an embodiment of the present disclosure will be described with reference to FIG. 1. FIG. 1 is an explanatory diagram for describing an example external appearance of a display control apparatus 100 according to an embodiment of the present disclosure. Referring to FIG. 1, the display control apparatus 100 is shown. In this example, the display control apparatus 100 is a smartphone.

For example, the display control apparatus 100 includes a display apparatus 101. The display control apparatus 100 displays a screen which is intended to be shown to the user of the display control apparatus 100, on the display apparatus 101.

Also, for example, the display control apparatus 100 includes a touch panel. In this case, the display apparatus 101 is a display surface of the touch panel. Also, the display control apparatus 100 detects the user's touch on the touch panel, and recognizes the user's touch operation based on the result of the detection.

Also, for example, the display control apparatus 100 includes a camera 103. An image generated through the camera 103 is stored in the display control apparatus 100, and displayed on the display apparatus 101.

2. Hardware Configuration

Figure 2:
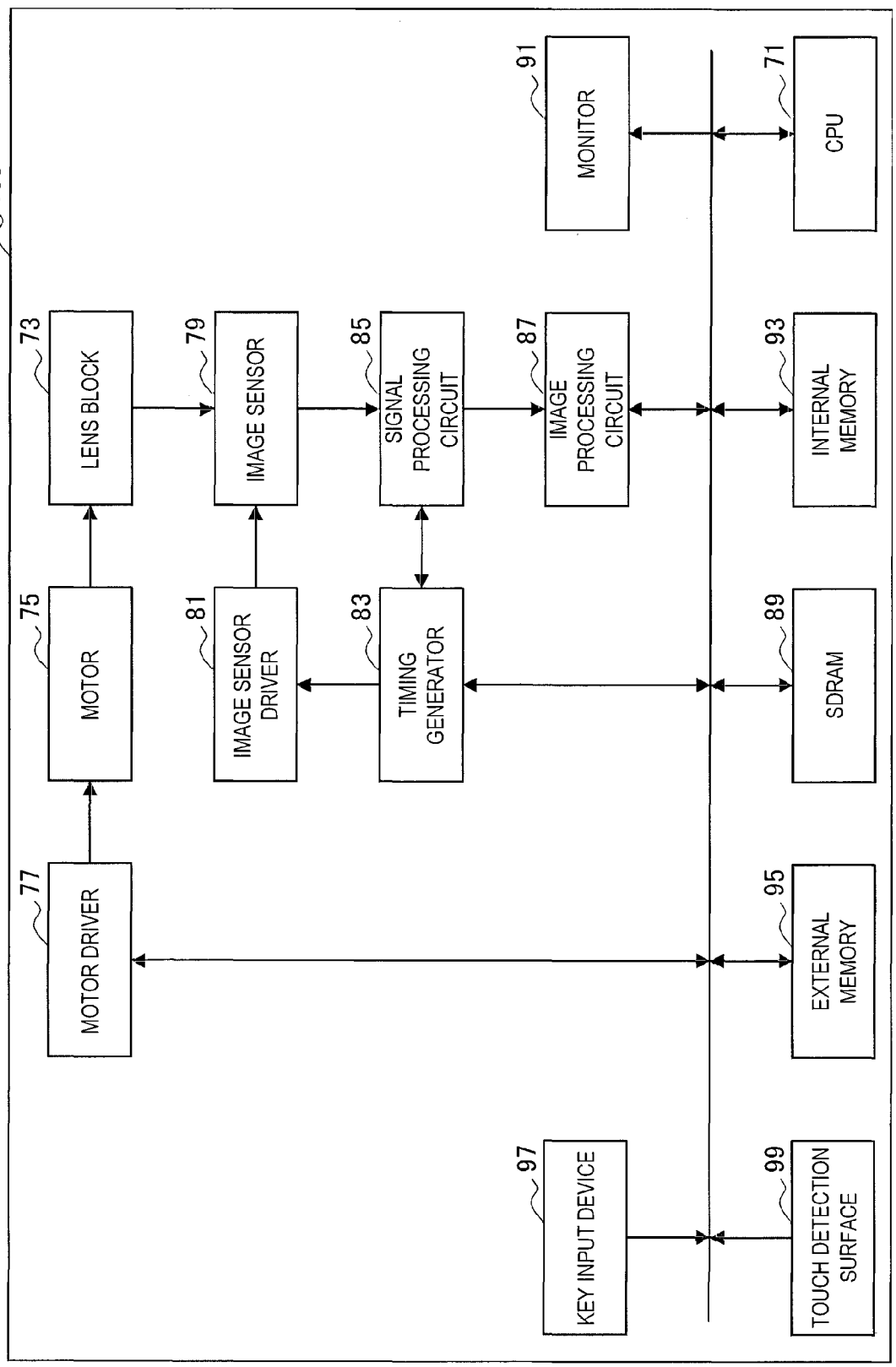
FIG. 2 is a block diagram showing an example hardware configuration of a display control apparatus according to an embodiment.

Next, an example hardware configuration of the display control apparatus 100 according to an embodiment of the present disclosure will be described with reference to FIG. 2. FIG. 2 is a block diagram showing an example hardware configuration of the display control apparatus 100 according to an embodiment. Referring to FIG. 2, the display control apparatus 100 includes, for example, a central processing unit (CPU) 71, a lens block 73, a motor 75, a motor driver 77, an image sensor 79, an image sensor driver 81, a timing generator 83, a signal processing circuit 85, an image processing circuit 87, a synchronous dynamic random access memory (SDRAM) 89, a monitor 91, an internal memory 93, an external memory 95, a key input device 97, and a touch detection surface 99.

The CPU 71 controls the entire display control apparatus 100.

The lens block 73, which is an optical system, is driven by the motor 75. Also, the motor 75 is controlled by the motor driver 77. The motor driver 77 controls the motor 75 according to a control signal from the CPU 71, to extend and collapse lenses when the power supply is turned on and off, or the like, to change the magnification of a zoom optical system, to adjust the focus, to adjust the diaphragm, and the like.

The image sensor 79 is, for example, any image sensor, such as a charge coupled device (CCD) or complementary metal oxide semiconductor (CMOS). The image sensor driver 81 controls the image sensor 79 according to a timing signal which is generated by the timing generator 83 according to a control signal of the CPU 71. The image sensor 79 converts an optical image of a subject imaged by the lens block 73 into an image capture signal by photoelectric conversion under the control of the image sensor driver 81, and outputs the image capture signal to the signal processing circuit 85.

The signal processing circuit 85 includes a circuit which removes noise contained in the image capture signal, an analog/digital converter which converts the image capture signal after noise removal into a digital signal, and the like. The signal processing circuit 85 outputs the resultant digital image capture signal to the image processing circuit 87. The image capture signal is RAW-formatted image data (hereinafter referred to as "RAW data").

The image processing circuit 87 converts the image capture signal into YUV-formatted image data (hereinafter referred to as "YUV data") containing a luminance (Y) signal and color difference (UV) signals. Also, the image processing circuit 87 optionally performs pixel interpolation. Also, the image processing circuit 87 performs image processes such as white balance adjustment, edge enhancement, changing of image tone, and the like, under the control of the CPU 71. The YUV data converted by the image processing circuit 87 is successively stored into the SDRAM 89. Also, in a shooting waiting state of a recording mode, each time one frame of YUV data is accumulated in the SDRAM 89, a live preview image (or a through image) corresponding to that YUV data is displayed on the monitor 91. The monitor 91 may be implemented using a liquid crystal, organic light-emitting diode (OLED), cathode ray tube (CRT), or the like. The monitor 91 is, for example, a display surface of the touch panel.

The YUV data is, for example, compressed into image data in some format such as the joint photographic experts group (JPEG), JPEG2000, or the like. Thereafter, the compressed image data is stored to the internal memory 93 included in the display control apparatus 100, or the removable external memory 95 (e.g., a memory card) connected to the display control apparatus 100 through an interface (not shown). Note that, in a playback mode, image data stored in the internal memory 93 or external memory 95 is read out by the CPU 71 according to a user operation as appropriate, converted into YUV data, which is then output to the SDRAM 89. Thereafter, the YUV data is displayed on the monitor 91.

A microcomputer (not shown) is connected to the CPU 71. Also, the key input device 97 (a TACT switch, etc.), the touch detection surface 99, and a power supply control circuit (not shown) are connected to the microcomputer. The touch detection surface 99 is, for example, a touch detection surface of the touch panel. The microcomputer regularly scans a key input operation to the key input device 97 and a touch operation on the touch detection surface 99. Thereafter, the microcomputer detects the user's key input operation to the key input device 97, and provides the detection result to the CPU 71. Also, the microcomputer detects the user's touch on the touch detection surface 99, and provides the detection result to the CPU 71. Also, the microcomputer controls power supply from the power supply control circuit.

An example hardware configuration of the display control apparatus 100 has been described above. This is for illustrative purposes only. The display control apparatus 100 may include other components such as a communication circuit and the like in addition to the above components, or may not necessarily include all of the above components.

3. First Embodiment

Firstly, a first embodiment of the present disclosure will be described. According to the first embodiment of the present disclosure, a live preview image, and a processed image(s) after image processing, are displayed, and the one or more processed images are updated according to a predetermined user operation.

<3.1. Configuration of Display Control Apparatus>

Figure 3:
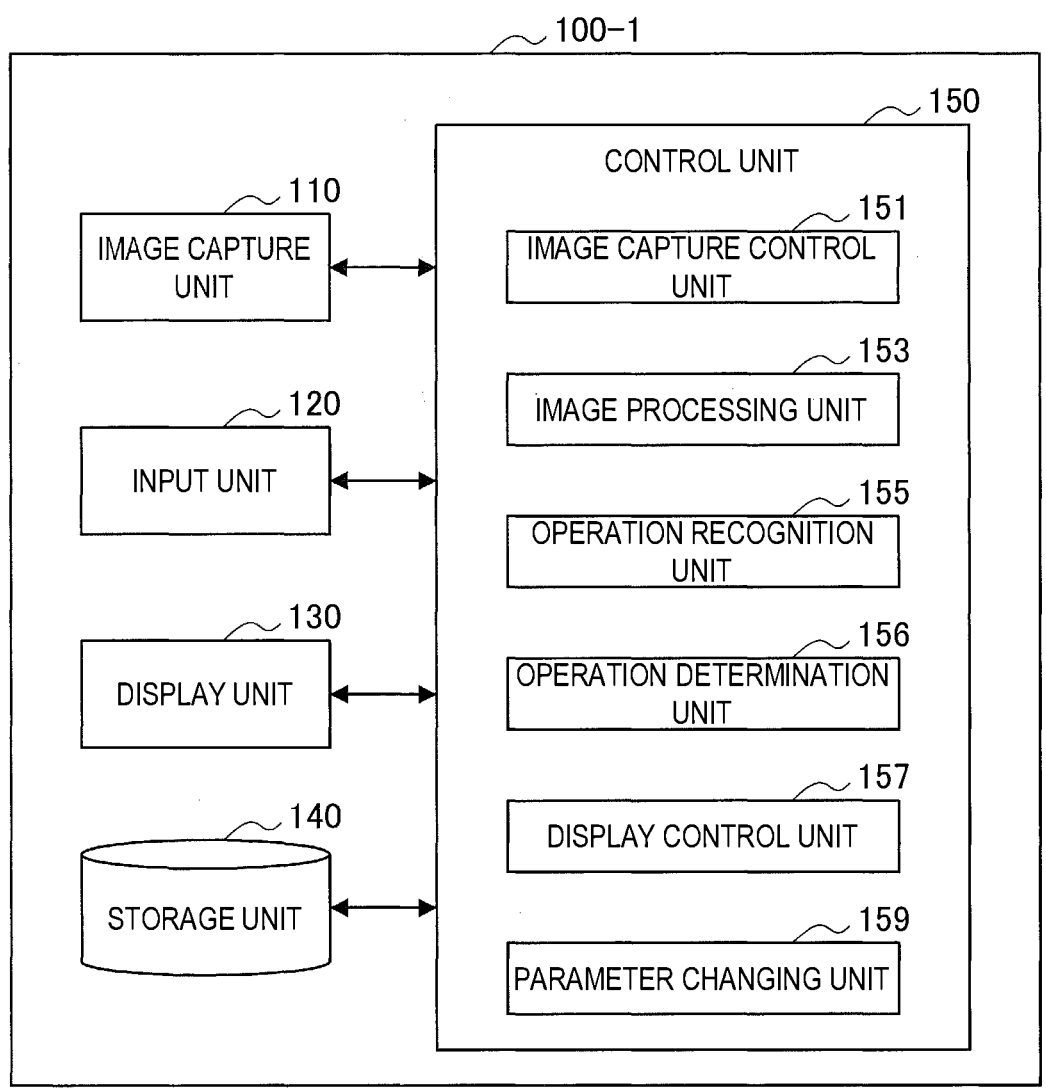
FIG. 3 is a block diagram showing an example configuration of a display control apparatus according to a first embodiment.

An example configuration of a display control apparatus 100-1 according to the first embodiment will be described with reference to FIG. 3 to FIG. 7. FIG. 3 is a block diagram showing an example configuration of the display control apparatus 100-1 according to the first embodiment. Referring to FIG. 3, the display control apparatus 100-1 includes an image capture unit 110, an input unit 120, a display unit 130, a storage unit 140, and a control unit 150.

(Image Capture Unit 110)

The image capture unit 110 obtains image data through an image sensor. The image data is, for example, RAW data.

For example, in the image capture unit 110, an image capture signal is output by the image sensor, and noise removal, analog/digital conversion, and the like are performed on the image capture signal. As a result, the above image data is obtained. The image capture unit 110 provides the image data to the control unit 150 (image processing unit 153).

Note that, as an example, the image capture unit 110 is implemented by the lens block 73, the motor 75, the motor driver 77, the image sensor 79, the image sensor driver 81, the timing generator 83, the signal processing circuit 85, and the like.

(Input Unit 120)

The input unit 120 detects a user operation. Thereafter, the input unit 120 provides the detection result to the control unit 150 (operation recognition unit 155).

For example, the input unit 120 detects the user's touch on the touch panel. Thereafter, the input unit 120 provides the detection result (e.g., touch position information) to the control unit 150 (operation recognition unit 155).

Also, the input unit 120 detects the user's key input operation to the key input device. Thereafter, the input unit 120 provides the detection result to the control unit 150 (operation recognition unit 155).

Note that, as an example, the input unit 120 may be implemented by the key input device 97, the touch detection surface 99, the above microcomputer (not shown), and the like.

(Display Unit 130)

The display unit 130 displays a screen which is intended to be shown to the user of the display control apparatus 100-1. In other words, the display unit 130 corresponds to the display apparatus 101. For example, the display unit 130 displays the screen under the control of the control unit 150 (display control unit 157).

Note that, as an example, the display unit 130 is implemented by the monitor 91 and the like. In other words, the display unit 130 is, for example, a display surface of the touch panel.

(Storage Unit 140)

The storage unit 140 stores a program and data for operation of the display control apparatus 100-1. Also, for example, the storage unit 140 stores image data obtained through the image capture unit 110 and/or the control unit 150 (image processing unit 153).

Note that, as an example, the storage unit 140 may be implemented by the SDRAM 89, the internal memory 93, the external memory 95, and the like.

(Control Unit 150)

The control unit 150 provides various functions of the display control apparatus 100-1. For example, the control unit 150 executes programs stored in the storage unit 140 or other storage media to provide the various functions. The control unit 150 includes an image capture control unit 151, the image processing unit 153, the operation recognition unit 155, an operation determination unit 156, the display control unit 157, and a parameter changing unit 159.

Note that, as an example, the image processing unit 153 may be implemented by the CPU 71, the image processing circuit 87, and the like.

(Image Capture Control Unit 151)

The image capture control unit 151 performs controls involved with image capture performed by the image capture unit 110.

For example, the image capture control unit 151 controls timing of image capture. More specifically, for example, the image capture control unit 151 provides a control signal for timing of image capture to the image capture unit 110, to control timing of image capture.

Also, for example, the image capture control unit 151 controls drive of the image capture unit 110. More specifically, for example, the image capture control unit 151 sends a control signal for drive to the image capture unit 110, to extend and collapse lenses when the power supply is turned on and off, or the like, to change the magnification of a zoom optical system, to adjust the focus, to adjust the diaphragm, and the like.

(Image Processing Unit 153)

The image processing unit 153 generates an image by performing image processing. For example, the image processing unit 153 generates an image based on image data obtained through the image sensor. Specifically, the image processing unit 153 generates an image based on image data provided by the image capture unit 110. The image data is, for example, RAW data.

Live Preview Image

In particular, in this embodiment, the image processing unit 153 generates a live preview image (or a through image) based on image data obtained through the image sensor. For example, in a waiting state of a shooting mode, the image processing unit 153 generates live preview images based on image data successively obtained through the image sensor.

Processed Image

Also, in particular, in this embodiment, the image processing unit 153 generates one or more processed images using respective image processing conditions, based on one of the image data that has been captured at some time point. For example, the image data is RAW data, and the one or more processed images are any image that can be generated by image processing based on RAW data. Also, the image processing conditions are any conditions for image processing.

For example, the image processing conditions include conditions for a development process of RAW data (hereinafter referred to as "development conditions"). The development conditions include, for example, white balance, contrast, brightness, and the like. As an example, a first processed image may be an image which is generated by a development process using first development conditions, and a second processed image may be an image which is generated by a development process using second development conditions. As a specific example, the first processed image may be an image having a higher contrast than that of a standard image, and the second processed image may be a brighter image than a standard image.

Also, for example, the image processing conditions include a modification process (and modification conditions of the modification process) which are further applied to an image after the development process. The modification process is, for example, extraction of a particular color (color accent), conversion into a negative image, conversion into an artistic image, and the like. As an example, a third processed image may be an image which has been subjected to a first modification process, and a fourth processed image may be an image which has been subjected to a second modification process. As a specific example, the third processed image may be an image in which a particular color has been extracted, and the fourth processed image may be an image which has been converted into an artistic image.

As described above, the image processing unit 153 may generate a processed image based on image data using any conditions for image processing.

Also, as described above, the image processing unit 153 generates one or more processed images based on one of the image data that has been obtained at some time point. That time point includes, for example, any time point after the display control unit 157 issues an instruction to generate a new processed image (e.g., a time point immediately after that). Specifically, the image processing unit 153 generates a new processed image after receiving the instruction from the display control unit 157. Also, the time point may include a time point when a shooting mode starts. Specifically, the image processing unit 153 may generate a first processed image when a shooting mode starts.

Also, for example, the one or more processed images may be an image containing a subject recued in size, the subject being captured in all or a portion of the live preview image. Specifically, the image processing unit 153 generates one or more processed images containing a subject reduced in size, the subject being captured in all or a portion of the live preview image. As an example, the one or more processed images are an image containing an entire subject reduced in size, the subject captured in the live preview image.

Also, for example, the one or more processed images are a plurality of processed images. Specifically, the image processing unit 153 generates a plurality of processed images using respective image processing conditions. In addition, for example, a subject captured in each of the plurality of processed images has at least a portion in common with a subject captured in one or more others of the plurality of processed images. As an example, a subject captured in each of the plurality of processed images has all portions in common with subjects captured in all the others of the plurality of processed images. In other words, the plurality of processed images contain the same subject.

(Operation Recognition Unit 155)

The operation recognition unit 155 recognizes a user operation. For example, the input unit 120, when detecting a user operation performed by the user of the display control apparatus 100-1, provides the result of the detection of the user operation to the operation recognition unit 155, and the operation recognition unit 155 obtains the detection result. Thereafter, the operation recognition unit 155 recognizes the user operation based on the detection result.

For example, the user operation includes a touch operation on the touch panel. Specifically, the operation recognition unit 155 recognizes a touch operation on the touch panel. More specifically, for example, the operation recognition unit 155 recognizes a touch event as a touch operation on the touch panel. The touch event includes, for example, tap, double tap, drag, flick, pinch, and the like. For example, the operation recognition unit 155 successively obtains touch position information as the detection result of a user operation, and recognizes a touch event from the touch position information successively obtained.

Also, for example, the user operation includes the user's key input operation to the key input device. Specifically, the operation recognition unit 155 recognizes a key input operation to the key input device. More specifically, for example, the operation recognition unit 155 recognizes the type of a key input operation as a key input operation to the key input device.

(Operation Determination Unit 156)

Determination of Update Operation

The operation determination unit 156 determines whether or not a predetermined user operation (hereinafter referred to as an "update operation") has been recognized.

For example, the update operation is a predetermined touch operation on the touch panel. More specifically, for example, the update operation is a touch operation at a predetermined position on the touch panel. As an example, the update operation is a touch operation at a position on the touch panel where the one or more processed images are displayed. Specifically, the operation determination unit 156 determines whether or not a touch operation (i.e., an update operation) has been recognized at a position on the touch panel where the one or more processed images are being displayed.

For example, the operation determination unit 156 monitors a user operation recognized by the operation recognition unit 155 to determine whether or not the user operation matches the update operation, thereby determining whether or not the update operation has been recognized. Thereafter, if the update operation has been recognized, the operation determination unit 156 notifies the display control unit 157 that the update operation has been recognized.

Determination of Parameter Changing Operation

The operation determination unit 156 determines whether or not another predetermined user operation (hereinafter referred to as a "parameter changing operation") has been recognized.

For example, as described below, a parameter for generating at least one of the one or more processed images is changed by the parameter changing unit 159. Also, the parameter changing operation is a touch operation at a position on the touch panel where an object for changing the parameter (hereinafter referred to as a parameter changing object) is displayed. The operation determination unit 156 determines whether or not a touch operation (i.e., a parameter changing operation) at a position on the touch panel where a parameter changing object is being displayed has been recognized.

For example, the operation determination unit 156 monitors a user operation recognized by the operation recognition unit 155 to determine whether or not the user operation matches the parameter changing operation, thereby determining whether or not the parameter changing operation has been recognized. Thereafter, if the parameter changing operation has been recognized, the operation determination unit 156 notifies the parameter changing unit 159 that the parameter changing operation has been recognized.

(Display Control Unit 157)

The display control unit 157 causes the display apparatus 101 to display a screen which is intended to be shown to the user. As described above, the display apparatus 101 corresponds to the display unit 130, and therefore, the display control unit 157 causes the display unit 130 to display the screen.

Display of Live Preview Image and Processed Image

In particular, in this embodiment, the display control unit 157 causes the display unit 130 to display a live preview image which is generated based on image data obtained through the image sensor, and one or more processed images which are generated using respective image processing conditions based on one of the image data that has been obtained at some time point. For example, the display control unit 157 causes the display unit 130 to display a screen containing a live preview image and one or more processed images generated by the image processing unit 153.

For example, the one or more processed images are an image containing a subject reduced in size, the subject being captured in all or a portion of the live preview image. Specifically, the display control unit 157 causes the display unit 130 to display one or more processed images containing a subject reduced in size, the subject being captured in all or a portion of the live preview image. As an example, the one or more processed images are an image containing a subject reduced in size, the subject being captured in all the live preview image.

By a processed image containing a subject reduced in size, the subject being captured in the live preview image being thus displayed, the user is allowed to easily visually compare the live preview image with the processed image. Therefore, by viewing the live preview image and the processed image, the user can easily imagine what kind of captured image will be obtained.

Also, for example, the one or more processed images are a plurality of processed images. Specifically, the display control unit 157 causes the display unit 130 to display a live preview image and a plurality of processed images.

A plurality of processed images are thus displayed, and therefore, the plurality of processed images generated using different image processing conditions can be visually compared. Therefore, the user can more easily determine which image process is desirable.

Also, for example, the plurality of processed images are displayed side by side. Specifically, the display control unit 157 causes the display unit 130 to display the plurality of processed images side by side.

A plurality of processed images are thus displayed side by side, and therefore, the user can more easily visually compare the plurality of processed images. In other words, the user can more easily determine which image processing condition is more desirable.

Also, for example, a subject captured in each of the plurality of processed images has at least a portion in common with a subject captured in one or more others of the plurality of processed images. As an example, a subject captured in each of the plurality of processed images has all portions in common with a subject captured in all the others of the plurality of processed images. In other words, the plurality of processed images contain the same subject.

A plurality of processed images thus have a captured subject in common, and therefore, the user is allowed to more easily visually compare the plurality of processed images. In other words, the user can more easily determine which image processing condition is more desirable.

For example, the above processed images are displayed. A specific example of screens will now be described with reference to FIG. 4.

FIG. 4 is an explanatory diagram for describing an example of a screen containing a live preview image and processed images. Referring to FIG. 4, the display control apparatus 100-1 is shown. Also, the display apparatus 101 of the display control apparatus 100-1 is showing a live preview image 10 and a plurality of processed images 20. The plurality of processed images 20 are being displayed side by side. Also, the plurality of processed images 20 are images generated using respective image processing conditions. Also, the plurality of processed images 20 are each an image containing an entire subject reduced in size, the subject being captured in the live preview image 10. Therefore, the plurality of processed images 20 contain the same subject.

A live preview image and a processed image(s) are thus displayed.

Updating of Processed Image

Also, in particular, in this embodiment, when it is determined that the above update operation has been recognized, the display control unit 157 updates the one or more processed images to be displayed.

For example, when the update operation has been recognized, the display control unit 157 is notified by the operation determination unit 156 that the update operation has been recognized. Thereafter, the display control unit 157 instructs the image processing unit 153 to generate a new processed image. Thereafter, the display control unit 157 causes the display unit 130 to display a live preview image, and one or more processed images which are generated based on image data at a new time point. Thus, the one or more processed images are updated. A specific example of the updating of a processed image will now be described with reference to FIG. 5A and FIG. 5B.

Figure 5A:
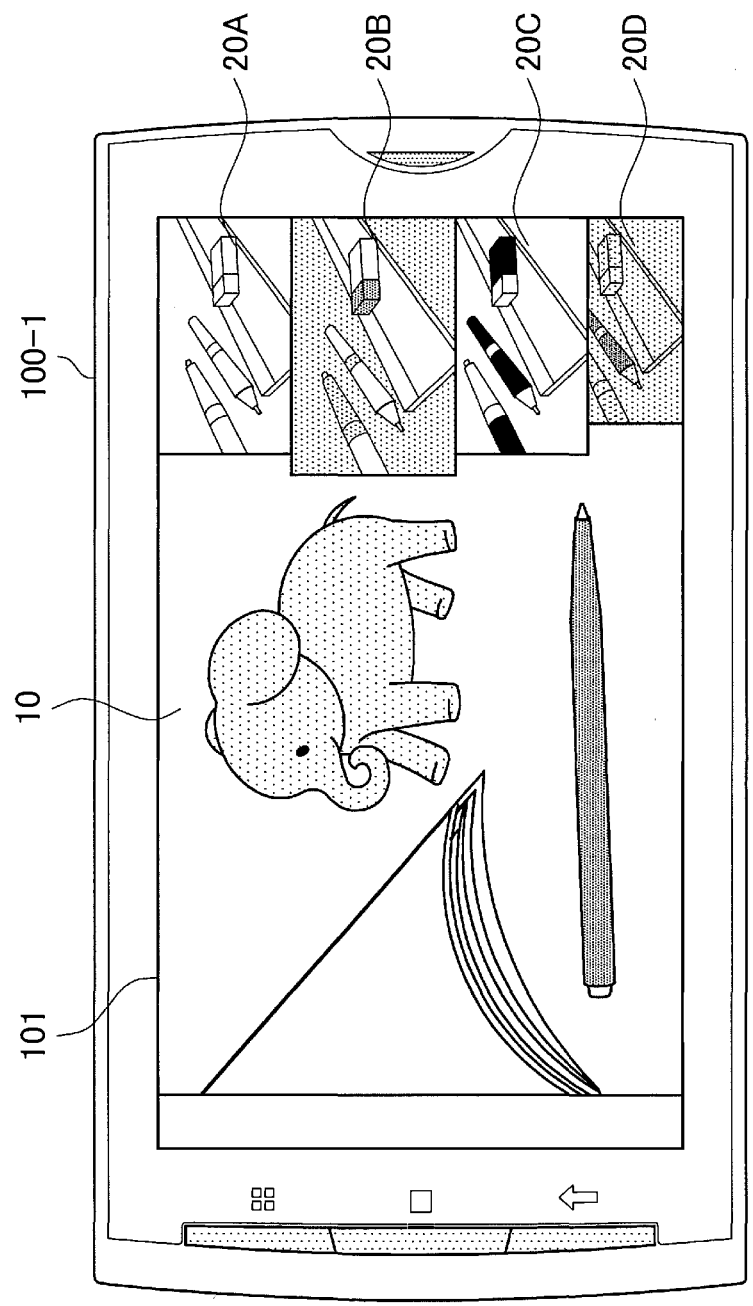
FIG. 5A is a first explanatory diagram for describing an example of updating of a processed image.
Figure 5B:
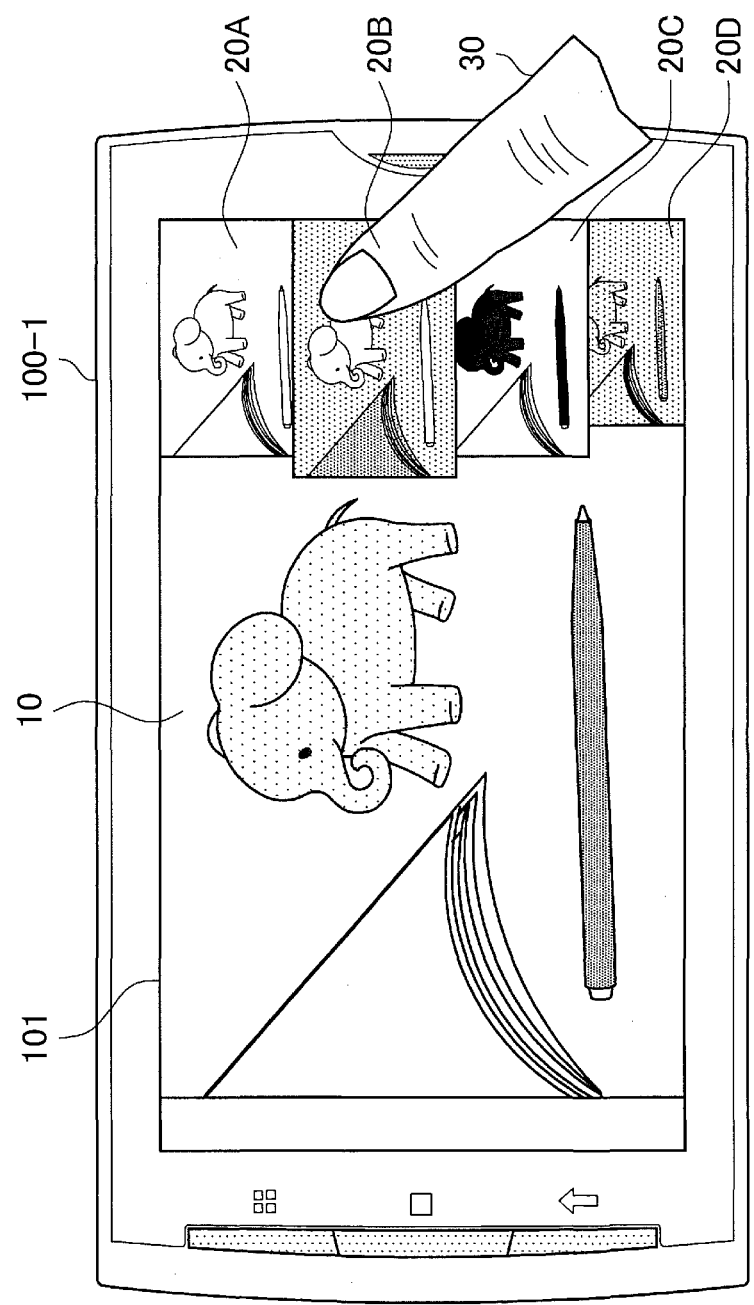
FIG. 5B is a second explanatory diagram for describing an example of updating of a processed image.

FIG. 5A and FIG. 5B are explanatory diagrams for describing an example of the updating of a processed image. Referring to FIG. 5A, the display control apparatus 100-1 is shown. Also, the display apparatus 101 of the display control apparatus 100-1 is showing a live preview image 10 and a plurality of processed images 20. For example, FIG. 5A shows an example in a case where the display control apparatus 100-1 shown in the example of FIG. 4 has been moved. As a result, while the plurality of processed images 20 shown in FIG. 5A are the same as the plurality of processed images 20 shown in FIG. 4, the live preview image 10 shown in FIG. 5A is different from the live preview image 10 shown in FIG. 4. Specifically, in the example shown in FIG. 5A, a subject captured in the live preview image 10 is different from a subject captured in the plurality of processed images 20. Therefore, the user of the display control apparatus 100-1 has difficulty in imagining what kind of captured image after image processing will be obtained when the user shoots a subject captured in the live preview image 10.

Therefore, as shown in FIG. 5B, the user performs a touch operation (e.g., tap) at a position where the plurality of processed images 20 are being displayed, using a finger 30. As a result, the plurality of processed images 20 are updated. Specifically, a subject captured in the live preview image 10 and a subject captured in the plurality of processed images 20 are similar to each other.

As a result, if the update operation is performed when necessary, the user is allowed to view a processed image containing a subject similar to that of a live preview image. Therefore, the user is allowed to easily check a captured image after image processing. Also, a processed image is updated only when the update operation has been performed, and therefore, the situation is avoided that the processed image is displayed as if it dropped some frames like when the processed image is not updated at a frame rate similar to that of a live preview image. Therefore, the user is allowed to check a captured image after image processing without stress. In other words, the user is allowed to easily check a captured image after image processing, without stress, during shooting.

Also, because the update operation is a touch operation, the user can easily perform an operation while viewing the screen, and therefore, is allowed to more easily update a processed image. Also, because the update operation is a touch operation at a position where a processed image is displayed, the user is allowed to update a processed image by a more intuitive operation.

Notification of Updating of Processed Image

Also, for example, when the one or more processed images have been updated, the user who has performed the update operation is notified that the one or more processed images have been updated. For example, when it is determined that the update operation has been recognized, the display control unit 157 causes the display unit 130 to display a screen containing the live preview image and the one or more processed images, the screen notifies update of the one or more processed images.

More specifically, for example, the screen contains an animation about the one or more processed images, the animation notifies update of the one or more processed images (hereinafter referred to as a "notification animation"). Specifically, when it is determined that the update operation has been recognized, the display control unit 157 causes the display unit 130 to display a screen containing the notification animation. The notification animation is, for example, fade-in of the one or more processed images. Also, the notification animation may be other animations such as flicker of the one or more processed images, zoom-in of the one or more processed images, and the like. A specific example of the notification animation will now be described with reference to FIG. 6.

FIG. 6 is an explanatory diagram for describing an example notification animation which notifies update of a processed image. Referring to FIG. 6, display states of processed images 20 at time $T_1$ to time $T_3$ are shown. When it is determined that the update operation has been recognized, fade-in of new processed images 20 is, for example, thus displayed over a period of time from time $T_1$ to time $T_3$.

Note that, instead of the notification animation, the screen may contain an object which notifies update of the one or more processed images (hereinafter referred to as a "notification object"). Specifically, when it is determined that the update operation has been recognized, the display control unit 157 may cause the display unit 130 to display a screen containing the notification object. The notification object is, for example, a graphical object surrounding the one or more processed images. Also, the notification object may be other objects such as an arrow object pointing at the one or more processed images, an object containing text information such as "Updated," and the like. A specific example of the notification object will now be described with reference to FIG. 7.

FIG. 7 is an explanatory diagram for describing an example notification object which notifies update of a processed image. Referring to FIG. 7, the display control apparatus 100-1 is shown as in FIG. 5B. Also, a live preview image 10 and a plurality of processed images 20 are being displayed on the display apparatus 101. Moreover, in this example, a rectangular notification object 40 surrounding the plurality of processed images 20 is also being displayed on the display apparatus 101. When it is determined that the update operation has been recognized, the notification object 40 is, for example, thus displayed.

Thus, the notification of updating of a processed image more reliably ensures that the user notices that the processed image has been updated, and also allows the user to understand a relation between the update operation and the updating of a processed image. Also, the notification using the screen even more reliably ensures that the user viewing the screen notices that a processed image has been updated. For example, the above notification animation is considerably noticeable on the screen. Therefore, the notification animation even more reliably ensures that the user viewing the screen notices that a processed image has been updated. Also, for example, the above notification object has only a small amount of data to be processed, and therefore, according to the notification object, the amount of data to be processed in the display process can be reduced while the user viewing the screen is allowed to notice the updating.

Display of Object for Changing Parameter

Also, for example, as described above, a parameter for generating at least one of the one or more processed images is changed by the parameter changing unit 159. Also, the display control unit 157 causes the display unit 130 to display an object for changing the parameter (i.e., a parameter changing object). As an example, the parameter changing object is a scrollbar. A specific example of this will now be described with reference to FIG. 8.

FIG. 8 is an explanatory diagram for describing an example of the parameter changing object. Referring to FIG. 8, the display control apparatus 100-1 is shown as in FIG. 5B. Also, a live preview image 10 and a plurality of processed images 20 are being displayed on the display apparatus 101. Also, in this example, a parameter changing object 50 which is a scrollbar is also being displayed on the display apparatus 101. The scrollbar 50 includes a thumb portion 51. The parameter changing object is, for example, thus displayed.

(Parameter Changing Unit 159)

The parameter changing unit 159 changes a parameter for generating a processed image. As an example, when a processed image is an image containing a higher contrast than that of a standard image, the parameter is the degree of contrast of the processed image.

In particular, when the live preview image and the one or more processed images are displayed on the display unit 130, the parameter changing unit 159 changes a parameter for generating at least one of the one or more processed images.

Also, in particular, when it is determined that the parameter changing operation has been recognized, the parameter changing unit 159 changes the parameter.

For example, when it is determined that the parameter changing operation has been recognized, the operation determination unit 156 notifies the parameter changing unit 159 that the parameter changing operation has been recognized. Thereafter, the parameter changing unit 159 changes the parameter for generating one or more processed images according to the parameter operation.

As an example, when a screen shown in FIG. 8 is being displayed by the display apparatus 101, the parameter changing operation moves the thumb 51 of the parameter changing object 50 which is a scrollbar. In this case, the parameter changing unit 159 changes the parameter for generating one (e.g., a processed image 20B) selected from the plurality of processed images 20 by an amount corresponding to the movement distance of the thumb.

Thus, when a processed image is being displayed, a parameter for generating the processed image is changed. This allows the user to adjust a parameter while actually viewing a processed image. Therefore, the user can easily check what a captured image after image processing will be like when a parameter is adjusted. In other words, convenience for the user is improved.

Also, the touch operation using the parameter changing object allows for adjustment of a parameter by an easy operation while viewing the screen.

<3.2. Flow of Process>

Figure 9:
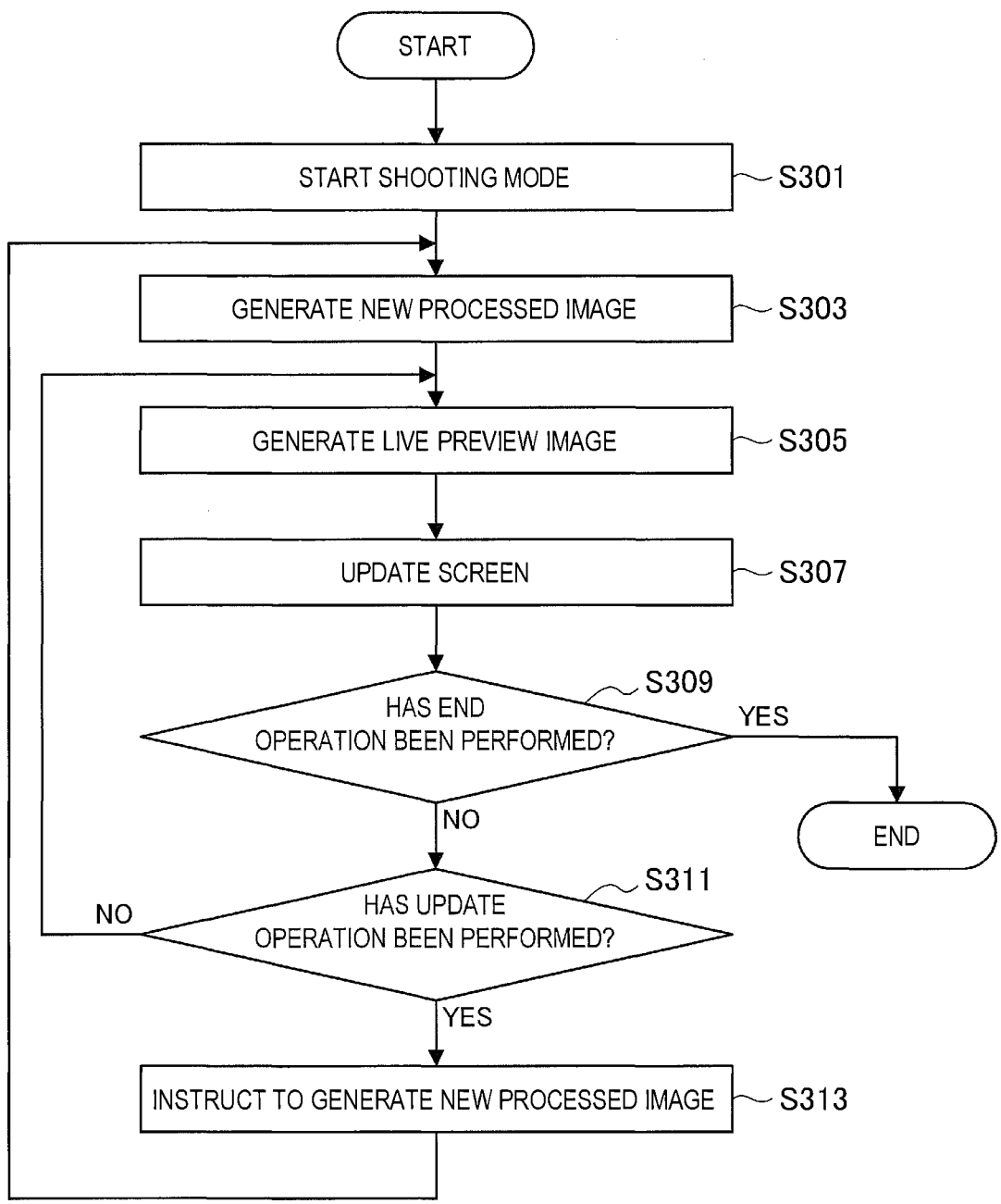
FIG. 9 is a flowchart showing a schematic flow of a display control process according to the first embodiment.

Next, an example display control process according to the first embodiment will be described with reference to FIG. 9. FIG. 9 is a flowchart showing a schematic flow of a display control process according to the first embodiment. The display control process is started by activation of an application for shooting.

Initially, in step S301, a shooting mode of an application for shooting begins.

In step S303, the image processing unit 153 generates one or more new processed images.

In step S305, the image processing unit 153 generates a live preview image.

In step S307, the display control unit 157 updates a screen containing the live preview image and the one or more processed images.

In step S309, the operation determination unit 156 determines whether or not an operation of ending the application or the shooting mode has been performed. If the end operation has been performed, the process is ended. Otherwise, the process proceeds to step S311.

In step S311, the operation determination unit 156 determines whether or not an update operation has been performed. If an update operation has been performed, the process proceeds to step S313. Otherwise, the process returns to step S305.

In step S313, the display control unit 157 instructs the image processing unit 153 to generate a new processed image. Thereafter, the process returns to step S303.

4. Second Embodiment

Next, a second embodiment of the present disclosure will be described.

As described above, JP 2007-194819A describes the technique of displaying a live preview image (or a through image) on a monitor while displaying sample images obtained by changing the tone of an image captured at some time point as thumbnails on the monitor. With this technique, the user of the digital camera selects a thumbnail having a desired image tone while viewing the live preview image, to set the digital camera to image capture conditions.

However, in the above technique, the sample image is displayed as a thumbnail, and therefore, is an image reduced in size more than the live preview image. Therefore, it may be difficult for the user to check details of what kind of captured image will be obtained, even by viewing the sample image displayed as a thumbnail.

Therefore, it is desirable to provide a way to allow the user to easily check a captured image after image processing, in greater detail.

Therefore, according to the second embodiment of the present disclosure, displayed are a live preview image, and a processed image containing a subject which is enlarged in size compared to the live preview image.

<4.1. Configuration of Display Control Apparatus>

Figure 10:
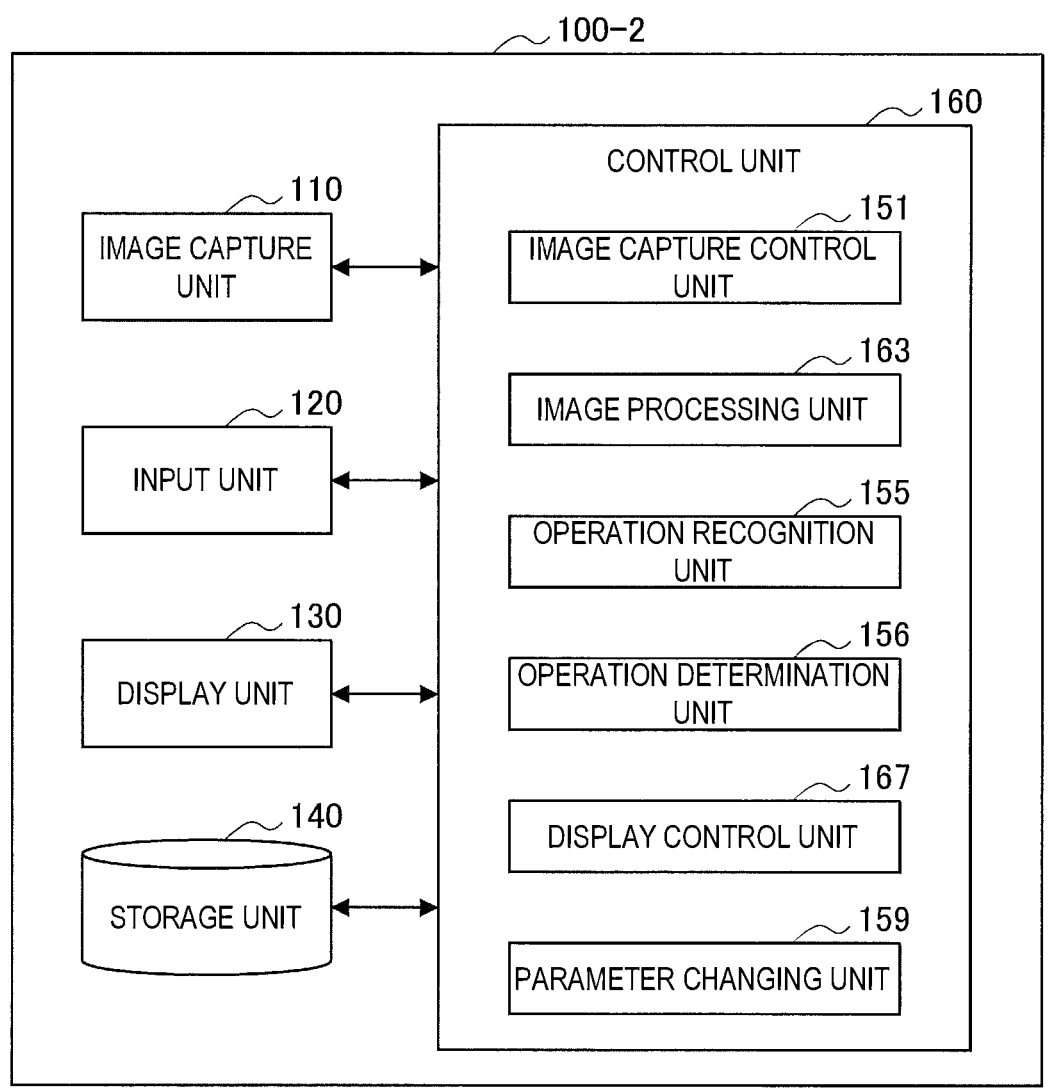
FIG. 10 is a block diagram showing an example configuration of a display control apparatus according to a second embodiment.

An example configuration of a display control apparatus 100-2 according to the second embodiment will be described with reference to FIG. 10 to FIG. 13. FIG. 10 is a block diagram showing an example configuration of the display control apparatus 100-2 according to the second embodiment. Referring to FIG. 10, the display control apparatus 100-2 includes an image capture unit 110, an input unit 120, a display unit 130, a storage unit 140, and a control unit 160.

Note that the image capture unit 110, input unit 120, display unit 130, and storage unit 140 of the second embodiment are not different from those of the first embodiment. Also, an image capture control unit 151, image processing unit 153, operation recognition unit 155, operation determination unit 156, and parameter changing unit 159 included in the control unit 160 of the second embodiment are not different from those of the first embodiment. Therefore, here, an image processing unit 163 and display control unit 167 which are included in the control unit 160 will be described.

(Image Processing Unit 163)

The image processing unit 163 generates an image by performing image processing. For example, the image processing unit 163 generates an image based on image data obtained through an image sensor. Specifically, the image processing unit 163 generates an image based on image data provided by the image capture unit 110. The image data is, for example, RAW data.

Live Preview Image

The image processing unit 163 generates a live preview image (or a through image) based on image data obtained through the image sensor. This is the same as what has been described as to the image processing unit 153 according to the first embodiment.

Processed Image

Also, the image processing unit 163 generates one or more processed images using respective image processing conditions based on one of the image data that has been obtained at some time point. For example, the image data is RAW data, and the one or more processed images are any image that may be generated by image processing based on RAW data. Also, the image processing conditions are any conditions related to image processing.

For example, the image processing conditions include conditions for a development process of RAW data (hereinafter referred to as "development conditions"). Also, for example, the image processing conditions include a modification process which is additionally performed on an image after the development process (and modification conditions for the modification process). These are the same as those which have been described as to the image processing unit 153 according to the first embodiment.

Thus, the image processing unit 163 may generate a processed image using any conditions for image processing based on image data.

Also, the above time point is, for example, some time point after the display control unit 157 has issued an instruction to generate a new processed image (e.g., a time point immediately after that). This is also the same as that which has been described as to the image processing unit 153 according to the first embodiment.

In particular, in this embodiment, the one or more processed images are an image containing a subject which is enlarged in size compared to the live preview image. Specifically, the image processing unit 163 generates one or more processed images containing a subject which is enlarged in size compared to the live preview image.

Also, for example, the one or more processed images are a plurality of processed images. Specifically, the image processing unit 163 generates a plurality of processed images using respective image processing conditions. Also, for example, a subject captured in each of the plurality of processed images has at least a portion in common with a subject captured in one or more others of the plurality of processed images.

(Display Control Unit 167)

The display control unit 167 causes the display apparatus 101 to display a screen which is intended to be shown to the user. As described above, the display apparatus 101 corresponds to the display unit 130, and therefore, the display control unit 157 causes the display unit 130 to display the screen.

Display of Live Preview Image and Processed Image

In this embodiment, the display control unit 167 causes the display unit 130 to display a live preview image which is generated based on image data obtained through the image sensor, and one or more processed images which are generated using respective image processing conditions based on one of the image data that has been obtained at some time point. For example, the display control unit 167 causes the display unit 130 to display a screen containing the live preview image and one or more processed images generated by the image processing unit 163.

Also, in particular, in this embodiment, the one or more processed images are an image containing a subject which is enlarged in size compared to the live preview image. Specifically, the display control unit 157 causes the display unit 130 to display one or more processed images containing a subject which is enlarged in size compared to the live preview image.

By an image containing a subject enlarged in size being thus displayed, the user is allowed to view details of a captured image after image processing. Therefore, the user can check what kind of captured image will be obtained, in greater detail, based on a processed image.

Also, for example, the one or more processed images are a plurality of processed images. Also, for example, the plurality of processed images are displayed side by side. Also, for example, a subject captured in each of the plurality of processed images has at least a portion in common with a subject captured in one or more others of the plurality of processed images. These are the same as those that have been described as to the display control unit 157 according to the first embodiment.

For example, the above processed image is displayed. Specific examples of screens will now be described with reference to FIG. 11 to FIG. 13.

Figure 11:
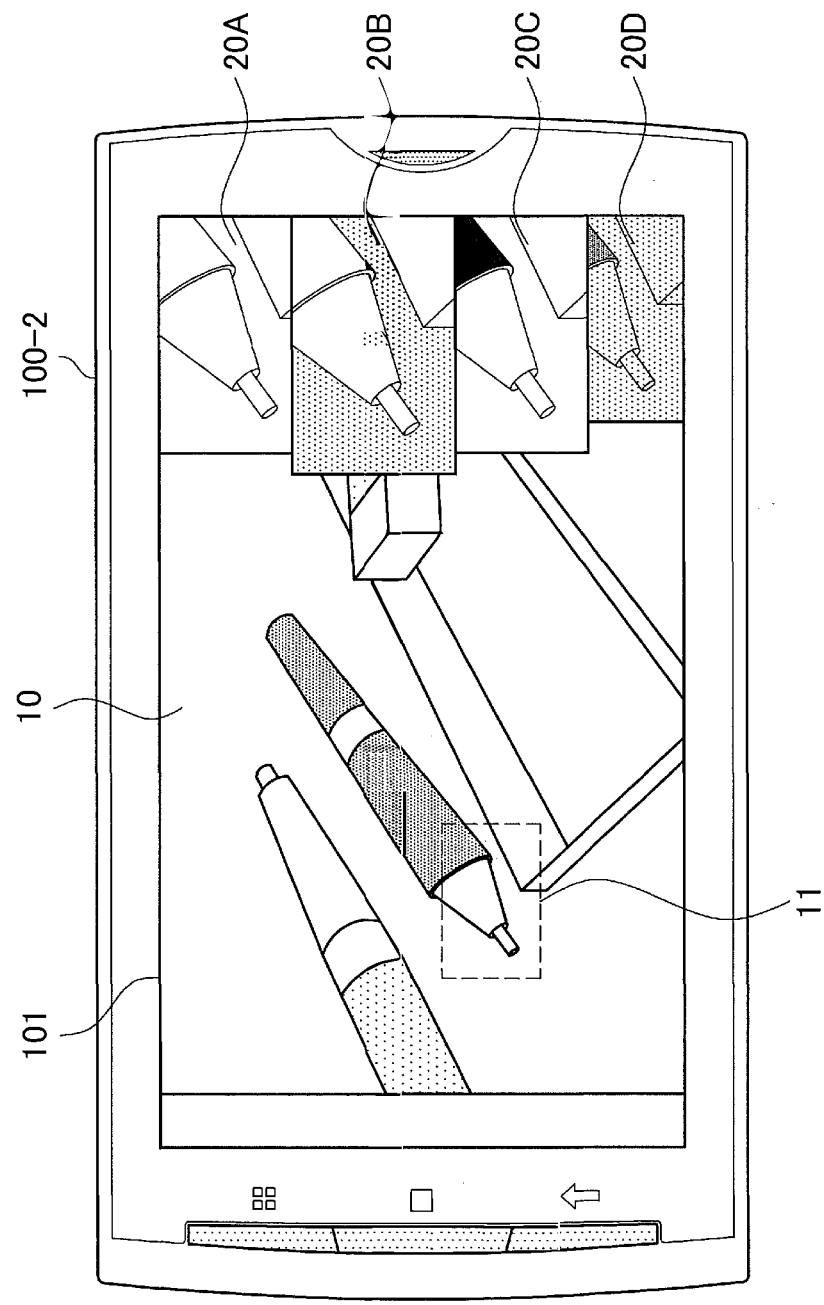
FIG. 11 is an explanatory diagram for describing a first example of a screen containing a live preview image and processed images according to the second embodiment.

FIG. 11 is an explanatory diagram for describing a first example of a screen containing a live preview image and processed images according to the second embodiment. Referring to FIG. 11, the display control apparatus 100-2 is shown. Also, a live preview image 10 and a plurality of processed images 20 are being displayed on the display apparatus 101 of the display control apparatus 100-2. The plurality of processed images 20 are images generated using respective image processing conditions. Also, the plurality of processed images 20 are each an image containing a subject which is enlarged in size compared to the live preview image 10. In particular, in this example, the plurality of processed images 20 are each an image which contains a subject enlarged in size, the subject being captured in a portion 11 of the live preview image 10. Therefore, the plurality of processed images 20 contain the same subject. Also, the plurality of processed images 20 are displayed side by side. Note that the portion 11 of the live preview image 10 may be displayed on the display apparatus 101. As an example, the portion 11 may be indicated by a dashed-line quadrangular object.

Figure 12:
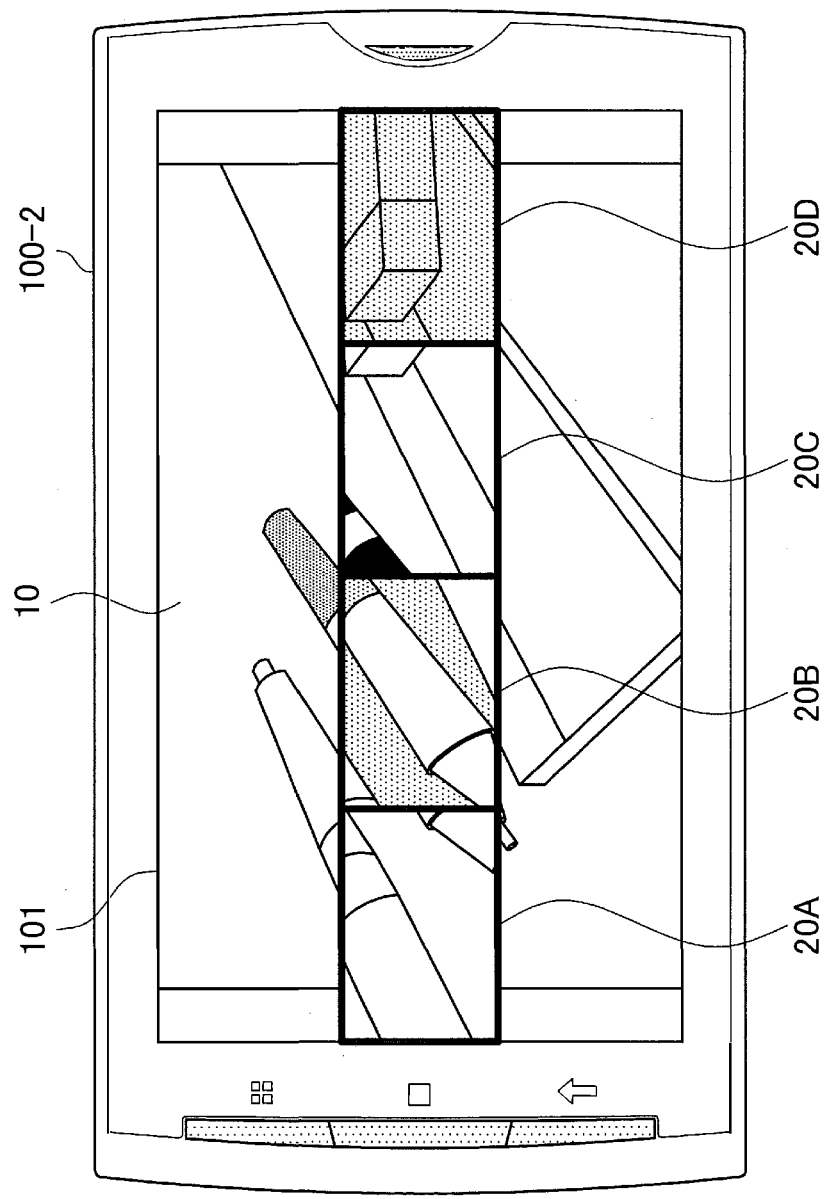
FIG. 12 is an explanatory diagram for describing a second example of a screen containing a live preview image and processed images according to the second embodiment.

FIG. 12 is an explanatory diagram for describing a second example of a screen containing a live preview image and processed images according to the second embodiment. Referring to FIG. 12, the display control apparatus 100-2 is shown. Also, a live preview image 10 and a plurality of processed images 20 are being displayed on the display apparatus 101 of the display control apparatus 100-2. The plurality of processed images 20 are images generated using respective image processing conditions. Also, the plurality of processed images 20 are each an image which contains a subject which is enlarged in size compared to the live preview image 10. Also, a subject contained in each of the processed images 20 has a portion in common with a subject captured in another processed image 20 next to that image 20.

Figure 13:
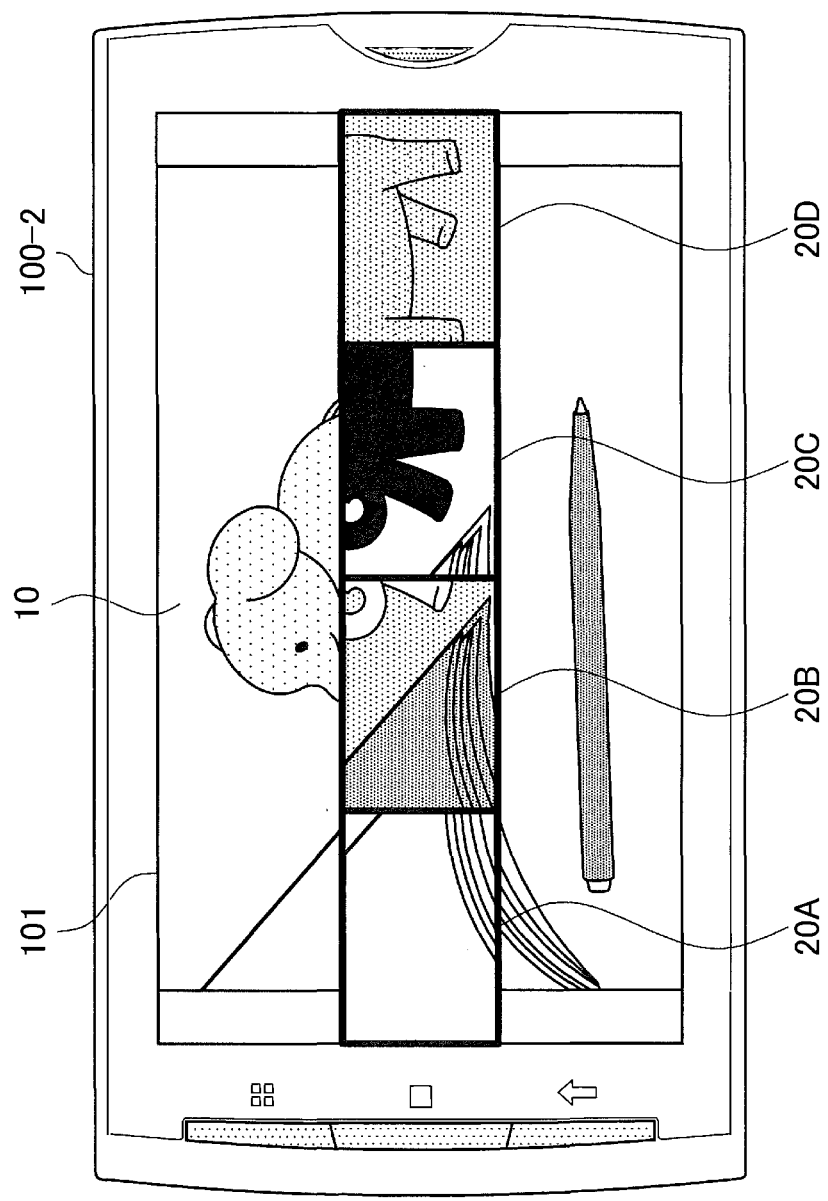
FIG. 13 is an explanatory diagram for describing a third example of a screen containing a live preview image and processed images according to the second embodiment.

FIG. 13 is an explanatory diagram for describing a third example of a screen containing a live preview image and processed images according to the second embodiment. Referring to FIG. 13, the display control apparatus 100-2 is shown. Also, a live preview image 10 and a plurality of processed images 20 are being displayed on the display apparatus 101 of the display control apparatus 100-2. The plurality of processed images 20 are images generated using respective image processing conditions. Also, the plurality of processed images 20 are each an image containing a subject which is enlarged in size compared to the live preview image 10. Also, a subject captured in each of the processed images 20 has a portion in common with a subject captured in another processed image 20 next to that one.

A live preview image and a processed image(s) are thus displayed.

Updating of Processed Image

Also, for example, in the second embodiment as well, when it is determined that the update operation has been recognized, the display control unit 167 updates the one or more processed images to be displayed. This is the same as that which has been described as to the display control unit 157 according to the first embodiment.

Notification of Updating of Processed Image

Also, for example, in the second embodiment as well, when the one or more processed images have been updated, the user who has performed the update operation is notified that the one or more processed images have been updated. This is the same as that which has been described as to the display control unit 157 according to the first embodiment.

Display of Object for Changing Parameter.

Also, for example, in the second embodiment as well, the display control unit 167 causes the display unit 130 to display an object for changing the parameter (i.e., a parameter changing object). This is the same as that which has been described as to the display control unit 157 according to the first embodiment.

<4.2. Flow of Process>

The display control process according to the second embodiment is similar to the display control process according to the first embodiment which has been described with reference to FIG. 9. A difference between the first embodiment and the second embodiment is that a different processed image is generated in step S303 shown in FIG. 9.

5. Conclusion

The display control apparatus 100 and display control process according to embodiments of the present disclosure have been described with reference to FIG. 1 to FIG. 13. According to an embodiment of the present disclosure, a display apparatus displays a live preview image generated based on image data obtained through an image sensor, and one or more processed images generated using respective image processing conditions based on one of the image data which has been obtained at some time point. In addition, it is determined whether or not an update operation has been recognized. If it is determined that the update operation has been recognized, the one or more processed images to be displayed are updated.

As a result, if an update operation is performed when necessary, the user is allowed to view a processed image containing a subject similar to that of a live preview image. Therefore, the user is allowed to easily check a captured image after image processing. Also, a processed image is updated only when an update operation has been performed, and therefore, the situation is avoided that the processed image is displayed as if it dropped some frames like when the processed image is not updated at a frame rate similar to that of a live preview image. Therefore, the user is allowed to check a captured image after image processing without stress. In other words, the user is allowed to easily check a captured image after image processing, without stress, during shooting.

For example, the display apparatus is a display surface of a touch panel, and the update operation is a predetermined touch operation on the touch panel.

As a result, the user can easily perform an operation while viewing the screen, and therefore, is allowed to more easily update a processed image.

For example, the update operation is a touch operation at a position on the touch panel where the one or more processed images are displayed.

This allows the user to update a processed image by a more intuitive operation. In other words, operability is improved.

For example, if the one or more processed images are updated, the update of the one or more processed images is notified to a user who has performed the update operation.

This ensures that the user notices that a processed image has been updated. Also, this allows the user to understand a relation between an update operation and the updating of a processed image.

For example, if it is determined that the update operation has been recognized, the display apparatus displays a screen notifying update of the one or more processed images, the screen containing the live preview image and the one or more processed images.

This more reliably ensures that the user viewing the screen notices that a processed image has been updated.

For example, the screen contains an animation (that is, notification animation) notifying the update of the one or more processed images, the animation being related to the one or more processed images.

The above notification animation is considerably noticeable in the screen. Therefore, the notification animation more reliably ensures that the user viewing the screen notices that a processed image has been updated.

For example, the screen contains an object (that is, notification object) notifying the update of the one or more processed images.

The above notification object has only a small amount of data to be processed, and therefore, according to the notification object, the amount of data to be processed in a display process can be reduced while the user viewing the screen is allowed to notice the updating.

For example, the one or more processed images are each an image containing a subject which is enlarged in size compared to the live preview image.

This allows the user to view details of a captured image after image processing. Therefore, the user can check what kind of captured image will be obtained, in greater detail, based on a processed image.

For example, the one or more processed images are each an image containing a subject which is reduced in size, the subject being captured in all or a portion of the live preview image.

This allows the user to easily visually compare a live preview image with a processed image. Therefore, by viewing the live preview image and the processed image, the user can easily imagine what kind of captured image will be obtained.

For example, the one or more processed images are a plurality of processed images.

As a result, a plurality of processed images generated using different image processing conditions can be visually compared. Therefore, the user can more easily determine which image process is desirable.

For example, the plurality of processed images are displayed side by side.

This allows the user to more easily visually compare a plurality of processed images. In other words, the user can more easily determine which image process conditions are more desirable.

For example, a subject captured in each of the plurality of processed images has at least a portion in common with the subject captured in one or more others of the plurality of processed images.

This allows the user to more easily visually compare a plurality of processed images. In other words, the user can more easily determine which image process conditions are more desirable.

Also, for example, when the live preview image and the one or more processed images are being displayed on the display apparatus, a parameter for generating at least one of the one or more processed images is changed. Also, it is determined whether or not a parameter changing operation has been recognized. Also, if it is determined that the parameter changing operation has been recognized, the parameter is changed.

This allows the user to adjust a parameter while actually viewing a processed image. Therefore, the user can easily check what a captured image after image processing will be like when a parameter is adjusted. In other words, convenience for the user is improved.

For example, the display apparatus is a display surface of a touch panel. In addition, the display apparatus additionally displays an object for changing the parameter. Moreover, the parameter changing operation is a touch operation at a position on the touch panel where the object is displayed.

This allows the user to adjust a parameter by an easy operation while viewing the screen.

It should be understood by those skilled in the art that various modifications, combinations, sub-combinations and alterations may occur depending on design requirements and other factors insofar as they are within the scope of the appended claims or the equivalents thereof.

For example, also, an example in which the update operation is a touch operation at a position where one or more processed images are being displayed, has been described. The present disclosure is not limited to this example. The update operation may be a touch operation at other positions (e.g., a position in the vicinity of a position where one or more processed images are being displayed, a position where an object representing a button is displayed, etc.), instead of a touch operation at a position where one or more processed images are being displayed. Also, the update operation may be a touch operation at any position (e.g., double tap at any position, pinch at any position, etc.), instead of a touch operation at a predetermined position. Also, the update operation may be other operations (e.g., a key input operation, an audio input operation, an input operation using a sensor, etc.), instead of a touch operation.

Also, an example in which a user operation recognized is monitored by an operation determination unit, has been described. The present disclosure is not limited to this example. For example, when an update operation or a parameter changing operation has been recognized, the operation recognition unit notifies the operation determination unit that the update operation or the parameter changing operation has been recognized. Thereafter, based on the reception of the notification, the operation determination unit may determine that the update operation or the parameter changing operation has been recognized.

Also, an example in which a screen displayed on a display apparatus is used to notify that a processed image has been updated, has been described. The present disclosure is not limited to this example. For example, other means (e.g., sound, vibration, etc.) may be used to notify that a processed image has been updated, instead of or in combination with notification using a screen.

Also, an example in which the display control apparatus is a smartphone has been described. The present disclosure is not limited to this example. For example, the display control apparatus may be other apparatuses having a camera and a display apparatus (e.g., a digital camera, tablet terminal, etc.) in addition to a smartphone. Also, the display control apparatus may be an apparatus which does not have a camera or a display apparatus. Specifically, the display control apparatus may be an apparatus (e.g., a server, etc.) which communicates with another apparatus having a camera or a display apparatus.

Moreover, the processing steps of the display control processing in the present specification do not necessarily have to be executed in time series in the order described in the flowchart. For example, the processing steps in the display control process may be executed in the order different from the order described in the flowchart, or may be executed in parallel.

Further, it is possible to create a computer program for causing hardware such as a CPU, a ROM, and a RAM which are incorporated into a display control apparatus to exert functions equivalent to those in the configuration of the display control apparatus. Further, a recording medium storing the computer program is also provided.

Additionally, the present technology may also be configured as below.

(1)

A display control apparatus including:

a display control unit configured to cause a display apparatus to display a live preview image generated based on image data obtained through an image sensor, and one or more processed images generated using respective image processing conditions based on one of the image data which has been obtained at some time point; and a determination unit configured to determine whether or not a predetermined user operation has been recognized, wherein if it is determined that the predetermined user operation has been recognized, the display control unit updates the one or more processed images to be displayed.

(2)

The display control apparatus according to (1), wherein the display apparatus is a display surface of a touch panel, and wherein the predetermined user operation is a predetermined touch operation on the touch panel.

(3)

The display control apparatus according to (2), wherein the predetermined user operation is a touch operation at a position on the touch panel where the one or more processed images are displayed.

(4)

The display control apparatus according to any one of (1) to (3), wherein if the one or more processed images are updated, the update of the one or more processed images is notified to a user who has performed the predetermined user operation.

(5)

The display control apparatus according to any one of (1) to (4), wherein if it is determined that the predetermined user operation has been recognized, the display control unit causes the display apparatus to display a screen notifying update of the one or more processed images, the screen containing the live preview image and the one or more processed images.

(6)

The display control apparatus according to (5), wherein the screen contains an animation notifying the update of the one or more processed images, the animation being related to the one or more processed images.

(7)

The display control apparatus according to (5), wherein the screen contains an object notifying the update of the one or more processed images.

(8)

The display control apparatus according to any one of (1) to (7), wherein the one or more processed images are each an image containing a subject which is enlarged in size compared to the live preview image.

(9)

The display control apparatus according to any one of (1) to (7), wherein the one or more processed images are each an image containing a subject which is reduced in size, the subject being captured in all or a portion of the live preview image.

(10)

The display control apparatus according to any one of (1) to (9), wherein the one or more processed images are a plurality of processed images.

(11)

The display control apparatus according to (10), wherein the plurality of processed images are displayed side by side.

(12)

The display control apparatus according to (10) or (11), wherein a subject captured in each of the plurality of processed images has at least a portion in common with the subject captured in one or more others of the plurality of processed images.

(13)

The display control apparatus according to any one of (1) to (12), further including:

a changing unit configured to change a parameter for generating at least one of the one or more processed images when the live preview image and the one or more processed images are being displayed on the display apparatus, wherein the determination unit determines whether or not another predetermined user operation has been recognized, and wherein if it is determined that the another predetermined user operation has been recognized, the changing unit changes the parameter.

(14)

The display control apparatus according to (13), wherein the display apparatus is a display surface of a touch panel, wherein the display control unit causes the display apparatus to additionally display an object for changing the parameter, and wherein the another predetermined user operation is a touch operation at a position on the touch panel where the object is displayed.

(15)

A program for causing a computer to function as:

a display control unit configured to cause a display apparatus to display a live preview image generated based on image data obtained through an image sensor, and one or more processed images generated using respective image processing conditions based on one of the image data which has been obtained at some time point; and a determination unit configured to determine whether or not a predetermined user operation has been recognized, wherein if it is determined that the predetermined user operation has been recognized, the display control unit updates the one or more processed images to be displayed.

(16)

A display control method including:

causing a display apparatus to display a live preview image generated based on image data obtained through an image sensor, and one or more processed images generated using respective image processing conditions based on one of the image data which has been obtained at some time point; and determining whether or not a predetermined user operation has been recognized, wherein if it is determined that the predetermined user operation has been recognized, the one or more processed images to be displayed are updated.

REFERENCE SIGNS LIST

10 live preview image
20 processed image
30 finger
40 notification object
100 display control apparatus
110 image capture unit
120 input unit
130 display unit
140 storage unit
150, 160 control unit
151 image capture control unit
153 image processing unit
155 operation recognition unit
156 operation determination unit
157, 167 display control unit
159 parameter changing unit

The invention claimed is:

1. An apparatus, comprising:
a display unit;
a touch panel;
at least one processor configured to:
  display a live preview image at a first display area of the display unit;
  detect, with the touch panel, a user operation to a part of a second display area of the display unit;
  generate, based on the live preview image and the detected user operation, a processed image by an image processing condition; and
  display, concurrent to the display of the live preview image at the first display area, the processed image at the second display area,
    wherein a rate of magnification of the processed image is different from a rate of magnification of the live preview image, and wherein at least one of the first display area or the second display area is at center of a third display area of the display unit.

2. The apparatus according to claim 1,
wherein subjects of the processed image are reduced in size compared to subjects of the live preview image.

3. The apparatus according to claim 1,
wherein the image processing condition is at least one of an extraction of a particular color accent, a conversion into a negative image, a conversion into an artistic image, or conditions for a development process of RAW data, and wherein the conditions for the development process comprise white balance, contrast, or brightness.

4. The apparatus according to claim 1,
wherein the second display area is at center of the first display area.

5. The apparatus according to claim 1,
wherein the live preview image comprises at least one subject, and
wherein a part of a subject of the at least one subject in an angle of view is absent.

6. The apparatus according to claim 1,
wherein the apparatus is a smartphone.

7. A method, comprising:
displaying a live preview image at a first display area of a display unit;
detecting, by a touch panel, a user operation to a part of a second display area of the display unit;
generating, based on the live preview image and the detected user operation, a processed image by an image processing condition; and
displaying, concurrent to the display of the live preview image at the first display area, the processed image at the second display area,
wherein a rate of magnification of the processed image is different from a rate of magnification of the live preview image, and
wherein at least one of the first display area or the second display area is at center of a third display area of the display unit.

8. The method according to claim 7,
wherein subjects of the processed image are reduced in size compared to subjects of the live preview image.

9. The method according to claim 7,
wherein the image processing condition is at least one of an extraction of a particular color accent, a conversion into a negative image, a conversion into an artistic image, or conditions for a development process of RAW data, and wherein the conditions for the development process comprise white balance, contrast, or brightness.

10. The method according to claim 7,
wherein the second display area is at center of the first display area.

11. The method according to claim 7,
wherein the live preview image comprises at least one subject, and
wherein a part of a subject of the at least one subject in an angle of view is absent.

12. A non-transitory computer-readable medium having stored thereon, computer-executable instructions for causing a computer to execute operations, the operations comprising:
displaying a live preview image at a first display area of a display unit;
detecting, by a touch panel, a user operation to a part of a second display area of the display unit;
generating, based on the live preview image and the detected user operation, a processed image by an image processing condition; and
displaying, concurrent to the display of the live preview image at the first display area, the processed image at the second display area,
wherein a rate of magnification of the processed image is different from a rate of magnification of the live preview image, and
wherein one of the first display area and the second display area is at center of a third display area of the display unit.

13. The non-transitory computer-readable medium according to claim 12,
wherein subjects of the processed image are reduced in size compared to subjects of the live preview image.

14. The non-transitory computer-readable medium according to claim 12,
wherein the image processing condition is at least one of an extraction of a particular color accent, a conversion into a negative image, a conversion into an artistic image, or conditions for a development process of RAW data, and wherein the conditions for the development process comprise white balance, contrast, or brightness.

15. The non-transitory computer-readable medium according to claim 12,
wherein the second display area is at center of the first display area.

16. The non-transitory computer-readable medium according to claim 12,
wherein the live preview image comprises at least one subject, and
wherein a part of a subject of the at least one subject in an angle of view is absent.

* * * * *